UNITED STATES PATENT OFFICE.

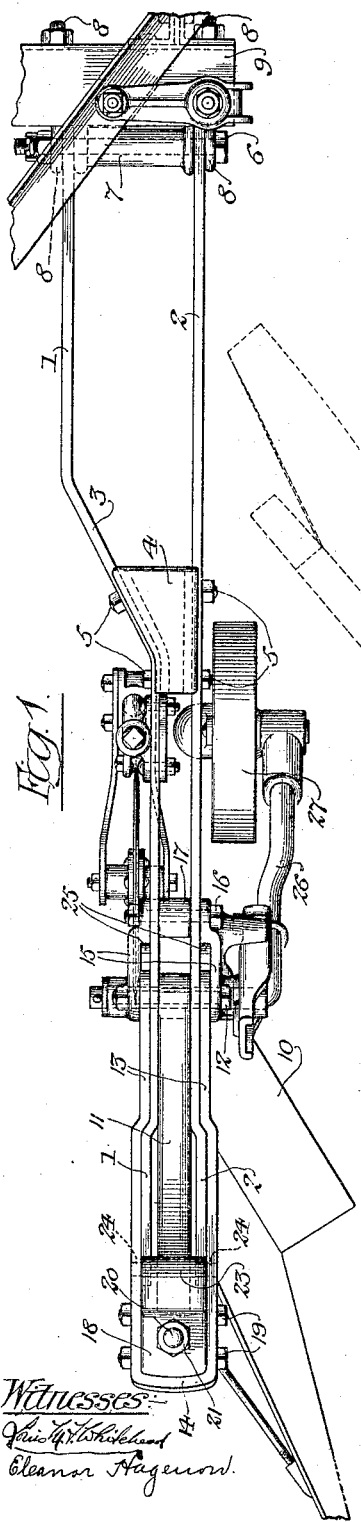

WILLIAM SOBEY, OF RACINE, WISCONSIN, ASSIGNOR TO J. I. CASE PLOW WORKS, OF RACINE, WISCONSIN, A CORPORATION.

PLOW.

1,187,560.  Specification of Letters Patent.  Patented June 20, 1916.

Original application filed May 25, 1911, Serial No. 629,269. Divided and this application filed October 5, 1912. Serial No. 724,122.

*To all whom it may concern:*

Be it known that I, WILLIAM SOBEY, a citizen of the United States, and a resident of Racine, county of Racine, and State of Wisconsin, have invented certain new and useful Improvements in Plows, of which the following is a full, clear, and exact description.

The improvement relates to plows and more particularly to plows such as are arranged in gangs drawn by traction engines.

The invention seeks to provide an improved manner of mounting the plow body upon the plow beam by which the pitch of the plow body can be readily adjusted and which is so arranged that the plow body can be thrown upwardly and forwardly independently of the main beam thereof in case the plow body strikes an obstruction and also to facilitate the removal of the plow bodies from their standards. The present application is a division of an earlier application filed by me in the United States Patent Office May 25, 1911, Serial No. 629,269.

The invention consists in the features of improvement hereinafter set forth, illustrated in the preferred form in the accompanying drawing and more particularly pointed out in the appended claims.

In the drawing, Figure 1 is a plan view of the improved plow. Fig. 2 is a view in elevation thereof, showing the plow body in shifted position in dotted lines.

The beam of each plow, in accordance with the preferred embodiment of the invention, comprises two main bars 1 and 2 which are spaced from one another at their rear ends and somewhat farther spaced apart at their forward ends. In the construction shown, the main beam bar 1 is provided between its ends with an offset or inclined portion 3. A filler block 4 is preferably interposed between the inclined portion 3 and the adjacent beam bar 2, and is connected thereto by bolts 5. As set forth in the application above referred to, the beam bars are coupled at their forward ends to the draft frame to permit the vertical rise and fall of the plow body connected thereto. Any suitable coupling may be employed. The coupling shown is similar to the one described and claimed in an application filed by me in the United States Patent Office March 20, 1912, Serial No. 685,080, and comprises a horizontal pivot bolt 6 which extends through the forward ends of the main beam bars and through an intermediate spacing sleeve 7. The ends of the horizontal pivot bolt 6 are engaged by a pair of eye-bolts 8 which extend forwardly therefrom through a bar 9 constituting part of the draft frame. The particular form of coupling forms no part of the present invention and need not be more fully set forth. It is understood, of course, that the main beam bars 1 and 2 are free to swing vertically upon the horizontal pivot bolt 6 as the plow is working in the ground, and also to raise and lower the plow from and to working position.

The plow body 10 is suitably secured to the lower end of a standard 11. The standard is preferably curved, as shown, and extends upwardly and forwardly from the plow body, the upper portion thereof being arranged between the rear ends of the main beam bars 1 and 2. The forward end of the standard is pivotally connected to the beam bars 1 and 2, at a point in front of the rear ends thereof, by a transverse bolt 12. The plow is provided with a supplemental beam which preferably comprises a pair of supplemental bars 13, which are arranged outside of the rear ends of the main bars 1 and 2 and the forward ends of which are pivotally connected to the main beam bars by the pivot bolt 12. In the preferred construction shown, the supplemental bars 13 are formed of a single piece bent to U-shaped form, so that the supplemental beam bars are connected at their rear ends by an integral transverse portion 14. The bolt 12 pivotally connects the plow standard 11 and the supplemental beam bars 13 to the main beam bars 1 and 2. This bolt also extends through the rear portions of a pair of brackets 15 which overlap the forward ends of the supplemental beam bars 13. The forward portions of these brackets abut against the outer faces of the beam bars 1 and 2 and are secured thereto by a transverse bolt 16. Preferably, as shown, this bolt extends through a filler block 17 arranged between the main beam bars 1 and 2.

The supplemental beam bars extend rearwardly beyond the ends of the main beam bars and are adjustably connected to the plow body or to the rear portion of the plow standard. In the preferred form shown, a cast metal block 18 is secured between the rear ends of the supplemental bars 13 by a pair of transverse bolts 19. A link or bolt 20 extends vertically through the block 18 and is fixed adjustably thereto by a pair of nuts 21 threaded on the bolt and engaging the upper and lower faces of the block. The lower end of the bolt is pivotally connected to a bracket 22 which is fixed to the lower rear portion of the standard 11 and projects rearwardly therefrom. The block 18 is provided with a forwardly projecting nose or lug 23 which normally rests upon the rear ends of the main beam bars 1 and 2. The rear ends of the main and supplemental beam bars are normally connected in rear of the pivoted bolt 12 by a pair of wooden break pins 24, which extend through registering holes therein.

By adjusting the nuts 21 on the bolt 20, the standard and the plow body can be tilted or adjusted about the horizontal pivot bolt 12 in order that the plow shall be presented at the proper angle to the ground and so be forced into the ground by the forward movement of the plowing structure. By tightening the nuts, the standard and plow body are rigidly secured to the supplemental beam bars. To facilitate this adjustment, the opening in the block 18, through which the bolt 20 extends, is preferably slightly conical. By removing the break pins 24, the supplemental beam bars 13, standard 12 and plow body 10 can be swung upwardly and forwardly past a vertical dead center position and into the position shown in dotted lines in Fig. 2. The parts are supported in this position by stop shoulders 25 (see Fig. 1) formed upon the brackets 15 and which engage and arrest the forward swing of the supplemental beam bars 13. In this position of the parts, the plow body can be readily removed from the standard for sharpening or for replacing the plow body with a different form, as required for different kinds of work. When the plow body is swung back to normal position, the stop lug 23 again engages the ends of the main beam bars 1 and 2 and the rear ends of the supplemental beam bars are then connected thereto by the wooden break pins 24. If the plow body strikes an unyielding obstruction, these pins will break and the plow body and parts connected thereto will be thrown upwardly without injuring any of the metal parts of the plow or of its lifting mechanism. After the plow body has been swung upwardly about the pivot bolt 12 it can be returned easily to proper position, since the adjustable connection between the supplemental beam bars and the plow standard is not disturbed and since the return movement of the plow body is arrested in proper position by the engagement of the nose or lug 23 with the rear ends of the main beam bars.

Any suitable lift mechanism may be connected to the main beam bars for raising and lowering the plow, and the adjustment of the plow for changing its pitch or angle to the ground, and the manner of mounting the same to permit it to swing upwardly and forwardly, are independent of any lift mechanism which is connected to the main beam bars. In the form shown, a standard 26 is pivotally mounted in the lower depending portions of the brackets 15 and carries a gage wheel 27. Suitable lifting and adjusting mechanism, such, for example, as set forth and claimed in the original application Serial No. 629,269 above referred to, can be connected to the gage wheel standard for raising and lowering the plow and adjusting its working depth. It is obvious that the supplemental beam bars, the plow standard, and the connections between these parts, and the main beam bars are all independent of the lift mechanism.

Obviously, changes may be made in the details set forth without departure from the essentials of the invention as defined in the claims.

I claim as my invention:—

1. In a plow, the combination with a draft frame, of a main beam pivoted at its forward end to said draft frame to rise and fall, a raising and lowering device connected to said main beam, a supplemental beam pivoted at its forward end to said main beam at a point in front of the rear end of said main beam, a plow body adjustably connected to said supplemental beam and arranged to swing upwardly and forwardly therewith past a vertical dead-center position, said supplemental beam being otherwise held against longitudinal and lateral movement relative to said main beam, a stop device interposed between said rear ends of said beams for limiting the rearward and downward movement of said plow and said supplemental beam, and a yielding device connecting said beams in rear of the pivotal connection between the same, substantially as described.

2. In a plow, the combination with a main beam, of a supplemental beam pivoted to said main beam, a plow body having an upwardly and forwardly projecting standard pivotally connected at its forward end to said supplemental beam, an adjustable connection between the rear end of said supplemental beam and said plow body, and means for securing the said supplemental beam to said main beam.

3. In a plow, the combination of a main beam, a lifting device connected thereto, a supplemental beam pivoted to said main beam forwardly of its rear end, a plow body, a standard therefor pivotally connected to said supplemental beam, an adjustable connection between the rear end of said supplemental beam and said plow body, and a break pin for connecting the rear ends of said main and supplemental beams.

4. In a plow, the combination of a pair of main beam bars spaced apart, a plow body having an upwardly and forwardly projecting standard arranged between said main beam bars, supplemental beam bars arranged outside said main bars, a common pivot connecting the forward ends of said standard and of said supplemental bars to said main beam bars, and an adjusting connection between the rear ends of said supplemental bars and said standard, and means for releasably connecting said main and supplemental beam bars.

5. In a plow, the combination with a suitable draft frame, of a trailing plow having a pair of beam bars spaced apart and pivotally connected at their forward ends to said frame, a plow body having an upwardly and forwardly projecting standard arranged between said beam bars and pivotally connected thereto at its forward end, a pair of supplemental beam bars pivotally connected to said main beam bars in line with the pivotal connection of said standard, an adjustable connection between the rear ends of said supplemental beam bars and said plow body, and break pins connecting the rear ends of said main and supplemental beam bars.

6. In a plow, the combination with a plow beam, of a plow body having an upwardly extending standard pivoted to said plow beam, a member pivotally connected to said plow beam and a break pin for holding said member against movement relative to said plow beam, said member being arranged to hold said standard and plow body in normal working position relatively to said beam.

7. In a plow, the combination with a pair of beam bars spaced apart, a plow body having an upwardly projecting standard pivoted between said bars, a member pivoted to said bars, means for releasably holding said member against movement relatively to said beam, and an adjusting device interposed between said member and said standard for holding the latter and said plow body in normal working position relatively to said beam.

WILLIAM SOBEY.

Witnesses:
STANLEY A. BREWER,
EDWARD E. WILLIAMS.

Copies of this patent may be obtained for five cents each, by addressing the "Commissioner of Patents, Washington, D. C."